Figure 1:
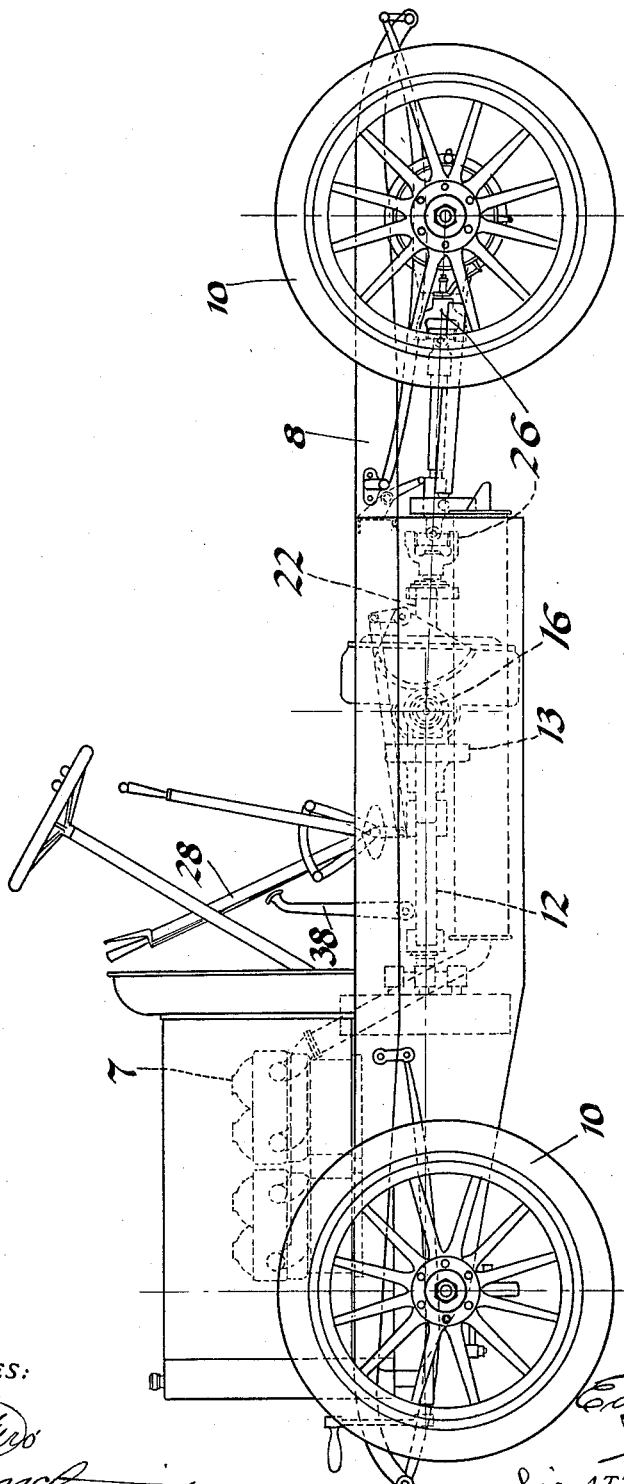

E. SEAVER, Jr.
TRANSMISSION MECHANISM.
APPLICATION FILED SEPT. 17, 1908.

1,029,641.

Patented June 18, 1912.

3 SHEETS—SHEET 1.

WITNESSES:

INVENTOR.
Edward Seaver Jr.
his. ATTORNEY IN FACT.

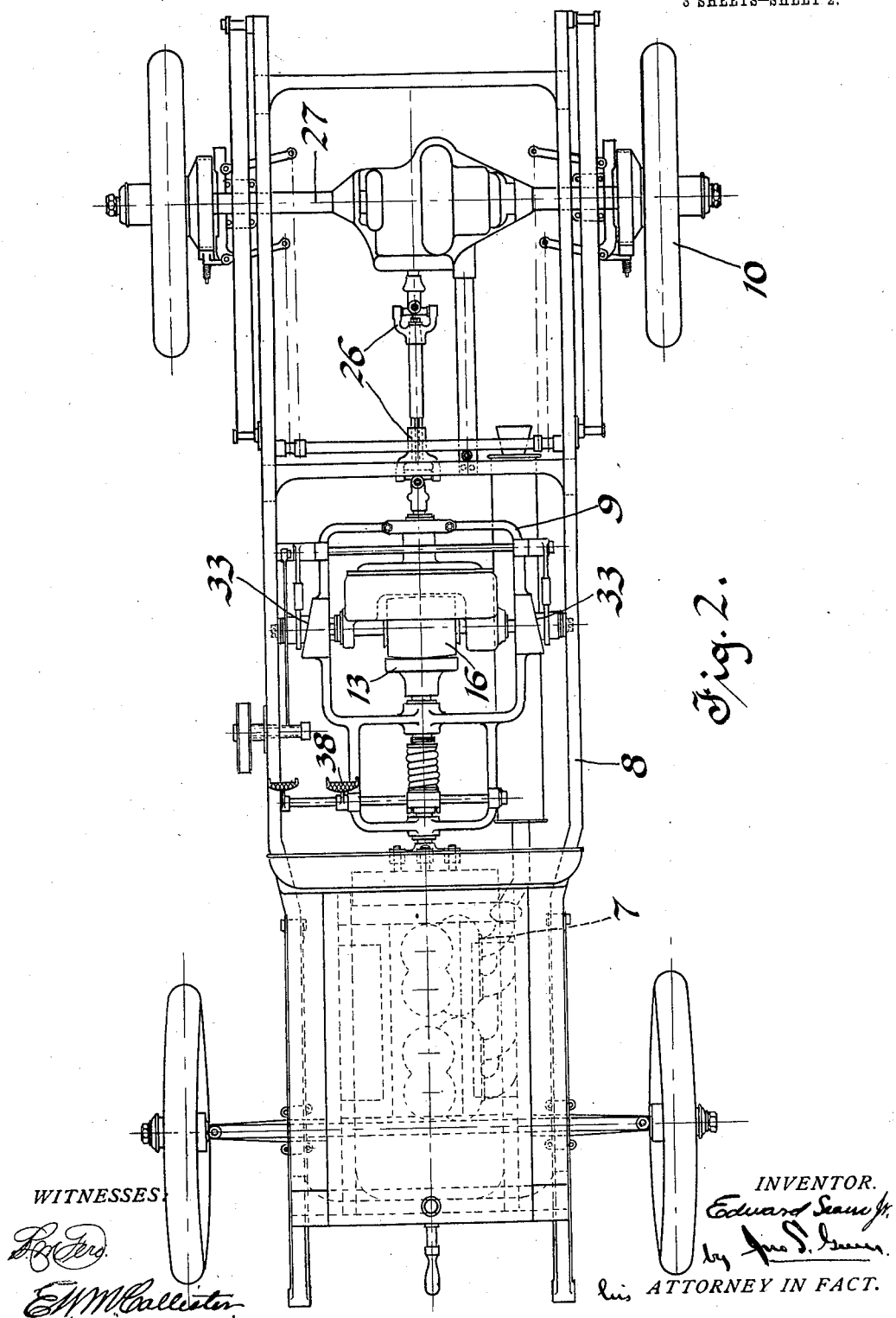

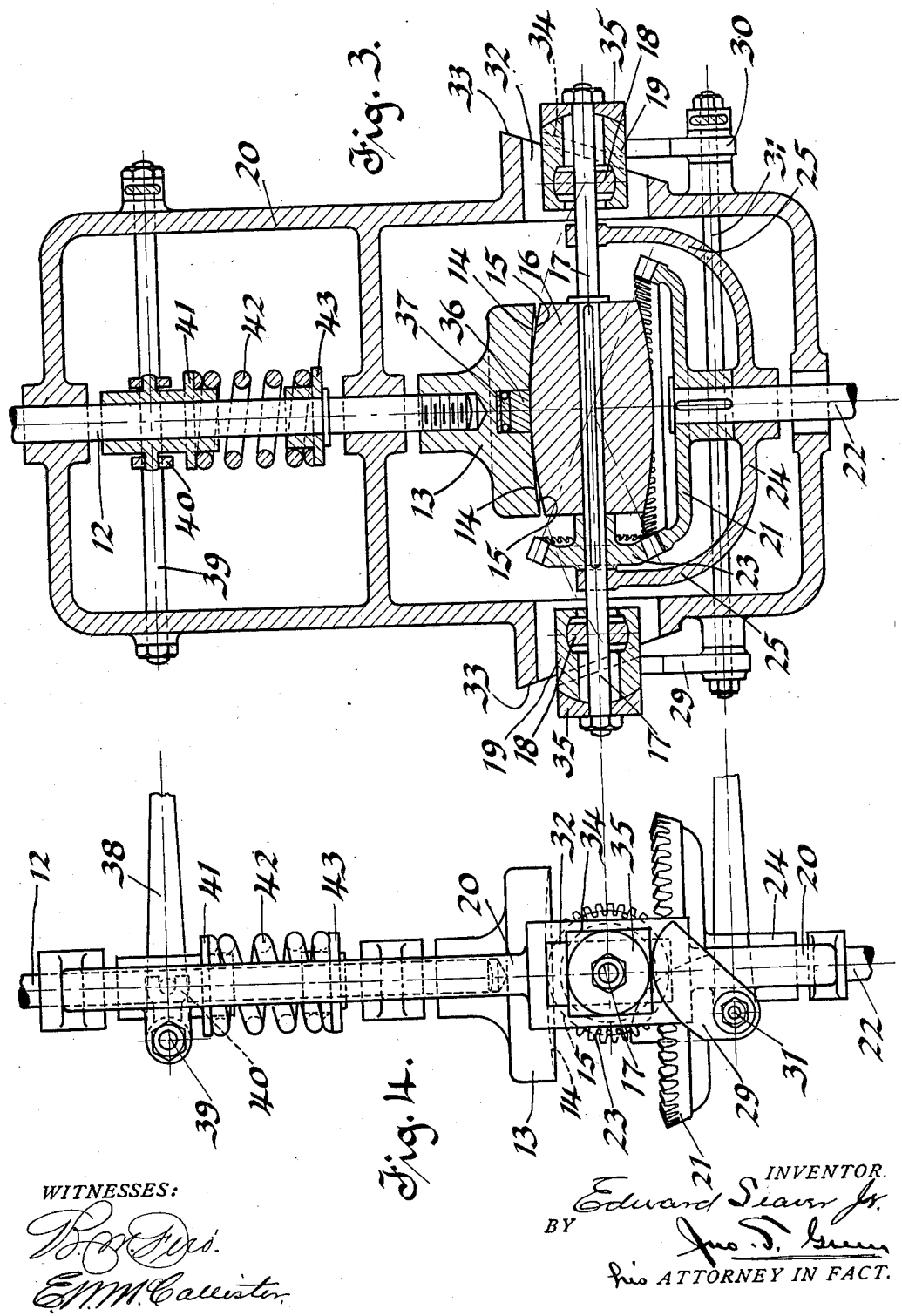

UNITED STATES PATENT OFFICE.

EDWARD SEAVER, JR., OF PITTSBURGH, PENNSYLVANIA.

TRANSMISSION MECHANISM.

1,029,641.  Specification of Letters Patent.  Patented June 18, 1912.

Application filed September 17, 1908. Serial No. 453,545.

*To all whom it may concern:*

Be it known that I, EDWARD SEAVER, Jr., a citizen of the United States, and a resident of Pittsburgh, in the county of Allegheny and State of Pennsylvania, have made a new and useful Invention in Transmission Mechanism, of which the following is a specification.

This invention relates to power transmission mechanisms and more particularly to friction gearing or friction drive transmission mechanisms.

In ordinary friction disk gearing, that is, in friction gearing in which the peripheral face of one element of the transmission mechanism contacts with the lateral face of the other element, considerable power is required to shift the one element across the face of the other even while the mechanism is transmitting motion and it is practically impossible to accomplish this while the mechanism is at rest if the two elements are held together under an operating pressure. For this reason it is customary and essential to provide means for breaking the driving contact between the elements for the purpose of changing the speed ratio of the mechanism. Such a device not only complicates the mechanism but, what is more objectionable, it complicates the manipulation of the mechanism.

An object of my invention is to produce a friction drive transmission mechanism which can be easily manipulated to vary the speed ratio, whether the mechanism is in operation or at rest without breaking the driving contact between the transmission elements.

A further object is the production of a friction drive transmission mechanism which can be reversed while the mechanism is in operation or at rest without breaking the driving contact between the transmission elements.

A further object is the production of such a mechanism in which one transmission element may be moved, while in operation, to a neutral point at which the friction between the transmission elements is reduced to a minimum, without reducing the operating pressure between the elements.

A still further object is the production of such mechanism in which the operating pressure between the contacting elements may be changed manually.

These and other objects I attain in a friction gear transmission mechanism embodying the features herein described and illustrated.

In the drawings accompanying this application and forming a part thereof: Figure 1 is a side elevation of the frame portion of an automobile equipped with a transmission mechanism embodying my invention; Fig. 2 is a plan view of the automobile shown in Fig. 1; Fig. 3 is a sectional plan view of a transmission mechanism embodying my invention; and, Fig. 4 is a side elevation of the mechanism shown in Fig. 3.

In carrying out my invention I employ a disk-shaped transmission element which is provided with a concave face, the radius of curvature of which is equal to twice the radius of curvature of the convex face of a barrel-shaped transmission element which contacts with it.

In the drawings I have illustrated the concave disk-shaped transmission element as the driving element of the mechanism and so, for convenience of description only and with no idea of so limiting my invention, I will refer to it throughout the remainder of the specification as the driving element, and to the convex or barrel-shaped element as the driven element.

It is a well known principle of mathematics that every point of the circumference of a circle describes a straight line when the circumference of that circle is rolled around the circumference of an inclosing circle of twice the diameter; and that the lines so described by the points of the circumference of the smaller circle are diameters of the larger circle. In developing the apparatus embodying my invention I have employed this principle in a manner that will hereinafter be made apparent.

The driven element of the transmission mechanism is more or less barrel-shaped and its curved face coincides in contour with a surface of revolution developed by revolving the arc of a circle, of one-half the radius of curvature of the concave face of the driving element, about the axis of rotation of the driven element.

The driven element is mounted on a shaft which extends substantially at right angles to the axis of rotation of the driving element, and which is provided with bearings located at points on the shaft where the convex surface, if produced, would intersect the axis of the shaft, that is, the axis of rotation of the element. By shifting the bearings of the driven element, both of which are movable, the mounting shaft of the driven element is rocked and the convex face of the driven element is caused to roll upon the concave face of the driving element. This varies the speed ratio of the transmission mechanism and affords means for reversing the direction of rotation of the driven element.

The centers of the bearings are located at points on the driven shaft which are theoretical points in the convex face produced and consequently the bearings move, during the angular motion of the shaft, in straight lines, which are diameters of the surface curvature of the driving element.

Referring to the drawings: The car as illustrated in Figs. 1 and 2, is provided with an engine 7, which is mounted on the frame 8, of the car and which delivers power, through a speed change or transmission mechanism 9, to the driving wheels 10 of the car. The shaft of the engine is directly connected, by means of a suitable coupling, with a shaft 12 of the transmission mechanism. A disk-shaped friction element or disk 13 is mounted on the end of the shaft 12 and its concave face 14 contacts with the convex face 15 of a barrel-shaped element 16 mounted on a shaft 17. The shaft 17 is provided with bearings 18 located at each end of the shaft and mounted in bearing boxes 19 supported by the frame portion 20 of the mechanism.

The motion transmitted from the engine, through the disk 13 to the element 16, is delivered to a bevel gear 21 mounted on a shaft 22, by a bevel gear 23, mounted on the shaft 17. The shaft 22 is a short shaft and is journaled in a swinging frame 24 supported on the shaft 17 by means of arms 25, which subtend the bevel gears and the transmission element 16. The rotary motion transmitted to the shaft 22 is delivered by means of universal or any suitable flexible couplings 26, to the driving axle 27, (an inclosed gearing being illustrated in the drawing between the couplings 26 and the shaft 27).

The radius of curvature of the face 14 of the friction disk 13 is equal to twice the radius of curvature of the convex face 15 of the element 16, and the speed ratio of the mechanism is varied by rocking the shaft 17 thereby causing the convex face of the element 16 to roll without sliding upon the concave face of the element 13 whereby the point of contact between the surfaces of the elements is shifted. This is accomplished by means of a hand-operated lever 28, which actuates cams 29 and 30, mounted on either end of a shaft 31 which is journaled in the casing 20.

The cams 29 and 30 are similar in all respects except that they are so located on the shaft 31 that their acting surfaces are reversed. The cam 29 engages a face of the bearing box 19 and is so located that it will rock the shaft 17, when the lever 28 is moved in one direction. During this motion of the lever the acting face of the cam 30 is shifted so as to permit the bearing box 19, with which it engages, to move backward an amount corresponding to the forward motion of the other bearing box. When the lever 28 is moved in the opposite direction the acting face of the cam 30, by engaging a face of the adjacent bearing box, rocks the shaft 17 in the reverse direction and the acting face of the cam 29 shifts to permit the motion. During this rocking or angular motion of the shaft 17 the convex face of the element 16 is caused to roll on the concave face of the element 13 without sliding. The bearings 18 of the shaft are so located that each moves in a straight line during the shifting of the shaft and the line of motion of each bearing is in the direction of a diameter of the concave face 14, produced, which passes through the center of the bearing.

Each bearing box 19 is mounted in a slot 32 provided in the frame 20 and which permits the box to move longitudinally in the frame, but prevents vertical motion. The frame portion adjacent to each slot 32 projects laterally and is provided with an inclined face 33 which extends parallel to the direction of the motion of the adjacent bearing during the rocking of the shaft 17; that is, in the direction of a diameter of the curved surface 14 passing through the center of the adjacent bearing. This face 33 guides the motion of bearing box 19 by means of a shoulder 34 on the bearing box.

Each bearing box is held in place on the shaft 17 and also in contact with the inclined surfaces 33 by means of a washer 35 suitably secured on the shaft 17 and which is provided with a concave flat face adapted to contact with a convex face of corresponding contour, provided on the end of the bearing box. The radius of curvature of these contacting curved surfaces is struck from the center of the adjacent bearing 18.

Each bearing 18 is provided with a spherical face and is located in a recess formed within the bearing box 19, which permits it to turn relative to the box during the rocking of the shaft 17. Sufficient clearance is provided around the shaft and between it and the bearing box to permit the shaft to occupy different angular positions relative to the box. During the rocking of the shaft 17 each box 19 is so guided by the face 33 and the concave face of the washer 35 that it turns, relative to the shaft 17, around the center of the bearing 18. The bearing blocks are prevented from moving vertically by the shape of the slots in which they are mounted.

A cylindrical disk 36 is so located in the center of the disk 13 that one of its end faces is flush with the concave face 14 of the disk. The disk 36 is provided with a ball bearing 37, which permits it to rotate relative to the disk 13.

The shaft 12 on which the disk 13 is mounted is movable longitudinally in its bearings for the purpose of manually varying the operative pressure between the disk 13 and the element 16. The pressure is varied by means of a foot lever 38 mounted on a shaft 39 which transmits longitudinal motion through a suitable bifurcated lever 40, mounted on the shaft, to a sleeve 41 which is loosely mounted on the shaft 12. The reciprocating motion of the sleeve 41 is employed in varying the compression of a spring 42 which surrounds the shaft 12 and which operates between a thrust collar 43, rigidly mounted on the shaft, and the sleeve 41. With such an arrangement the lever 38 may be moved through a greater arc in varying the operative pressure between the transmission elements than would be the case if the spring were omitted and for this reason it may be provided with means for locking it into various positions for the purpose of maintaining various operating pressures on the transmission elements.

When the lever 28 is moved in one direction the shaft 17 is rocked to such a position through the agency of the cams 29 and 30 that the element 16 contacts with the operating face of the disk 13 on one side of the neutral point of the disk and consequently drives the car in one direction. When the lever is moved in the other direction the shaft 17 is rocked to such a position that the point of contact between the contacting surfaces of the transmission mechanism is shifted across the face of each element through the neutral point and to the other side of the center of the concave face of the disk; the motion of the car is thus reversed. The neutral point of the face 14 is replaced by the cylindrical disk 36 which is rotatable relative to face 14 for the purpose of reducing the friction between the contacting faces when the disks occupy the neutral positions and consequently reduces the wear on the face of the element 16.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. In friction gearing, two rotatable elements one of which is concave while the other is convex, and the bearings of one of which are fixed and means for rolling the other element on the contacting face of the first mentioned element without sliding, whereby the effective angular velocity of said gearing is changed.

2. In friction gearing, driving and driven elements one of which is concave while the other is convex, shafts on which said elements are mounted, the bearings for one of said shafts being fixed, means for changing the angularity of the other shaft whereby one of said elements is caused to roll upon the other element without sliding, to change the effective angular velocity of said gearing.

3. In friction gearing, driving and driven elements, mounting shafts for each element, movable bearings for one of said shafts, means for shifting said bearings to rock said shaft in such a manner that the element it carries is rolled across the other element without sliding whereby the effective angular velocity of said gearing is changed and means for causing said bearing to move in a straight line during the shifting operation.

4. In friction gearing, contacting friction elements, one of which is provided with a concave friction face and the other with a convex friction face the radius of curvature of which is twice that of the concave face and means for varying the angular velocity ratio.

5. In friction gearing, a disk-shaped friction element provided with a concave frictional driving face and a barrel-shaped element contacting therewith and provided with a convex frictional driving face.

6. In friction gearing, a disk-shaped friction element provided with a concave frictional driving face, a barrel-shaped element contacting therewith and provided with a convex frictional driving face, and means for causing the convex face of one element to roll across the concave face of the other to vary the speed ratio of the gearing.

7. In friction gearing, a disk-shaped friction element provided with a concave frictional driving face, a barrel-shaped element contacting therewith and provided with a convex frictional driving face, yielding means for forcing the friction surfaces of said elements into driving contact and means for rolling one element across the driving face of the other element to vary the speed ratio of the gearing.

8. In friction gearing, a disk-shaped friction element provided with a concave frictional driving face, a barrel-shaped element contacting therewith and provided with a convex frictional driving face, yielding means for forcing the driving surfaces of said elements into operating contact, means for rolling one element across the driving face of the other element to vary the speed ratio of the gearing and means for varying the operating pressure and breaking the contact between said elements.

9. In friction gearing, an element provided with a concave frictional face, an element contacting therewith and provided with a convex frictional face of one-half the radius of curvature of the concave face and bearings for the convex element located at theoretical points in the convex face produced.

10. In friction gearing, an element provided with a concave frictional face, an element contacting therewith and provided with a convex frictional face of one-half the radius of curvature of the concave face, bearings for the convex element located at theoretical points in the convex face produced and means for shifting said bearings to vary the speed ratio of said gearing.

11. In friction gearing, an element provided with a concave frictional face, an element contacting therewith and provided with a convex frictional face of one-half the radius of curvature of the concave face, bearings for said latter element located at theoretical points in the convex face produced and means for shifting said bearings along lines which theoretically correspond to diameters of the concave face.

12. In friction gearing, a driven member and a driving member, a mounting shaft for each member, means for rocking one of said shafts to vary the speed ratio of said gearing, a frame suspended from the rackable shaft and intermeshing transmission gears one of which is mounted on said shaft and one of which is carried by said frame.

13. In friction gearing, a driving and a driven element, a mounting shaft for each element, shiftable bearings for one of the shafts, cams for moving said bearings to rock said shaft and guides for causing each bearing to move in a straight line.

14. In friction gearing, driving and driven elements each provided with a curved frictional face the radius of curvature of one of which is twice that of the other and means for changing the angular velocity ratio.

15. In friction gearing, driving and driven elements, a mounting shaft for each element and means whereby the bearings of one shaft are moved in straight lines to vary the angular position of said shaft and to thereby vary the speed ratio of the gearing.

16. In friction gearing, driving and driven elements, a mounting shaft for each element, movable bearings for one of said shafts and means for manually moving said bearings in straight lines to vary the angular position of said shaft and to thereby vary the speed ratio of the gearing.

17. In friction gearing, driving and driven elements each provided with a curved frictional face the radius of curvature of one of which is twice that of the other and means for rolling one of said elements in contact with the other without sliding.

18. In friction gearing, driving and driven elements each provided with a curved frictional face the radius of curvature of one of which is twice that of the other, a mounting shaft for each element and means whereby the bearings of one shaft are moved in a straight line to vary the speed ratio of the gearing.

19. In friction gearing, an element provided with a concave frictional face, an element contacting therewith, and provided with a convex frictional face of greater curvature than the concave face, movable bearings for one of said elements, and a guide for controlling the motion of said bearings the operating face of which is parallel to a diameter of the face of less curvature.

20. In a friction gearing, an element provided with a concave frictional face, an element contacting therewith, and provided with a convex frictional face of greater curvature than the concave face, a movable bearing for said convex element and a guide for controlling the movement of said bearing, the operating surface of which is parallel to the diameter of the concave face.

21. In a friction gearing, an element provided with a concave frictional face, an element provided with a convex frictional face of greater curvature than the concave face and means for changing the angular velocity ratio.

22. In a friction gearing, a driving element provided with a concave frictional contact face, a driven element provided with convex frictional face of greater curvature than the concave face and means for changing the angular velocity ratio.

23. In a friction gearing, a rotatable element provided with a concave frictional face, a rotatable element contacting therewith, and provided with a convex frictional face of greater curvature than the concave face and means for changing the angular velocity ratio.

24. In a friction gearing, an element provided with a concave frictional face and an element provided with a convex frictional face of greater curvature than the concave face and movable bearings for said convex element, whereby said element is rolled across the face of said concave element to change the effective angular velocity of said gearing.

25. In friction gearing, driving and driven elements, shafts on which said elements are mounted, bearings for said shafts, one of said bearings being fixed while the other moves in a straight line and means for changing the point of contact between said elements by rolling one upon the other without sliding to change the effective angular velocity of said gearing.

26. In friction gearing, driving and driven elements, one of which is concave while the other is convex, shafts on which said elements are mounted, the bearings for one of said shafts being fixed and means for changing the position of the other shaft whereby one of said elements is caused to roll upon the other without sliding to change the effective angular velocity of said gearing.

27. In friction gearing, driving and driven elements, mounting shafts therefor, a movable bearing for the shaft of one element, means for shifting said bearing in such manner that the element it carries is rolled across the other without sliding whereby the effective angular velocity of said gearing is changed and means for causing said bearing to move in a straight line during the shifting operation.

28. In friction gearing, driving and driven members, shafts therefor, means for rocking one of said members to vary the speed ratio of said gearing, the rocking member rotating on its shaft to vary the speed ratio of said gearing, a movable bearing for the shaft of said rockable member for controlling the position of said member and means for causing said bearing to move in a straight line.

29. In friction gearing, driving and driven elements, mounting shafts therefor, the bearings for one of which is fixed and means whereby the bearings on the other shaft is caused to move in a straight line to vary the point of contact of said elements, one of the elements rolling across the face of the other element to vary the speed ratio of the gearing.

30. In friction gearing, driving and driven elements, one of the elements rolling across the face of the other element, mounting shafts therefor, bearings for said shafts, one of which is fixed and means for manually moving one of said bearings in a straight line to vary the speed ratio of the gearing.

31. In friction gearing, driving and driven elements, each provided with a curved frictional face, the radius of curvature of one of which is twice that of the other and means for rolling one of said elements in contact with the other without sliding to change the angular velocity ratio of said gearing, the rolling element being movable on a line located in an axis of the face of the larger radius of curvature.

32. In a friction gearing, driving and driven elements, one of said elements having a concave and the other a convex face, one element being so guided that it can roll across the face of the other to change the angular velocity ratio, a pinion driven by the rolling element and a gear always in mesh with the pinion.

In testimony whereof, I have hereunto subscribed my name this 15th day of September, 1908.

EDWARD SEAVER, Jr.

Witnesses:
CHARLES W. McGHEE,
E. W. McCALLISTER.